United States Patent
Born et al.

[11] Patent Number: 6,064,440
[45] Date of Patent: May 16, 2000

[54] APPARATUS FOR INSERTING DATA INTO THE VERTICAL BLANKING INTERVAL OF A VIDEO SIGNAL

[75] Inventors: Gregory S. Born, Westbrook; Paul A. Cousineau, Portland; Kenneth R. Thompson, Kennebunk, all of Me.

[73] Assignee: Navis Digital Media Systems, Kennebunk, Me.

[21] Appl. No.: 09/004,475

[22] Filed: Jan. 8, 1998

[51] Int. Cl.[7] .................................................. H04N 7/087
[52] U.S. Cl. ........................ 348/478; 348/473; 348/461; 348/13
[58] Field of Search ..................... 348/478, 479, 348/476, 477, 473, 461, 563, 567, 705, 13; 455/4.2, 5.1, 6.1; 358/147, 142; H04N 7/087, 7/08

[56] References Cited

U.S. PATENT DOCUMENTS

| | | | |
|---|---|---|---|
| 4,099,259 | 7/1978 | Parsons et al. | 364/900 |
| 4,191,969 | 3/1980 | Briand et al. | 348/478 |
| 4,367,488 | 1/1983 | Leventer et al. | 348/478 |
| 4,380,027 | 4/1983 | Leventer et al. | 348/478 |
| 4,424,532 | 1/1984 | den Toonder et al. | 358/120 |
| 4,638,359 | 1/1987 | Watson | 358/147 |
| 4,802,023 | 1/1989 | Williams | 360/14.3 |
| 4,814,883 | 3/1989 | Perine et al. | 358/181 |
| 4,855,827 | 8/1989 | Best | 348/473 |
| 4,910,595 | 3/1990 | Bugg et al. | 358/147 |
| 4,931,870 | 6/1990 | den Hollander | 358/142 |
| 5,287,409 | 2/1994 | Westerfer et al. | 380/15 |
| 5,418,853 | 5/1995 | Kanota et al. | 380/5 |
| 5,455,630 | 10/1995 | McFarland et al. | 348/476 |
| 5,497,187 | 3/1996 | Banker et al. | 348/6 |
| 5,543,852 | 8/1996 | Yuen et al. | 348/478 |
| 5,555,024 | 9/1996 | Limberg | 348/473 |
| 5,579,055 | 11/1996 | Hamilton et al. | 348/476 |
| 5,587,743 | 12/1996 | Montgomery et al. | 348/473 |
| 5,604,542 | 2/1997 | Dedrick | 348/478 |
| 5,619,274 | 4/1997 | Roop et al. | 348/461 |
| 5,844,615 | 12/1998 | Nuber et al. | 348/478 |
| 5,907,366 | 5/1999 | Farmer et al. | 348/478 |

OTHER PUBLICATIONS

Applied Micro Technology, Inc., "Model 468/480 VBI Receiver".
Applied Micro Technology, Inc., "Model 501 Multiline VBI Inserter".
Norpak Corporation, TES3, "Multistandard VBI Encoding Platform" copyright 1996.
Norpak Corporation, VBI Data Broadcasting, "Point-to-Multipoint Data Communications" copyright 1996.

*Primary Examiner*—John K. Peng
*Assistant Examiner*—Jean W. Désir
*Attorney, Agent, or Firm*—Cesari and McKenna, LLP

[57] ABSTRACT

An improved data inserter for inserting data into selected lines, including the vertical blanking interval, of a television or video signal. The data inserter includes a parallel interface for receiving data and a digital signal processor (DSP) for controlling the insertion of that data. A dual port memory structure is used to temporarily store data to be inserted. The dual port memory is associated with and connected to an autobuffer unit. Each video signal received by the inserter is provided to a switch which is also coupled to the autobuffer unit so that the switch may receive data stored in the dual port memory devices. When a selected line in a given video signal is detected by the DSP, it triggers the respective autobuffer unit which, in turn, transfers the data out of the dual port memory to the respective switch for insertion into the selected line of the video signal.

16 Claims, 5 Drawing Sheets

APPARATUS FOR INSERTING DATA INTO THE VERTICAL BLANKING INTERVAL OF A VIDEO SIGNAL

FIELD OF THE INVENTION

The present invention relates generally to data communications, and more specifically, to an improved apparatus for inserting data into the vertical blanking interval of a video signal.

BACKGROUND OF THE INVENTION

To form images on a television, an electron beam is scanned across a phosphor screen along a predefined scanning pattern or "raster". As the beam is moved across the screen, its intensity is modulated in accordance with the received analog signal, thereby forming picture elements or pixels on the screen. The amount of illumination at any point on the screen, moreover, is proportional to the beam's intensity at that point. Typically, the scanning pattern comprises a set number of lines. Upon scanning all of the lines of the predefined scanning pattern, a frame corresponding to an image is produced.

To provide sufficient resolution of the image, the U.S. standard provides for 525 lines per frame drawn at a rate of thirty frames per second. This rate, however, results in a sensation of flicker rather than smooth movement. To eliminate flicker, a process known as interlacing is used. More specifically, each frame is divided into two fields of 262.5 lines each and the lines of the two fields are interlaced with one another. By interlacing the lines of the two fields, the screen is effectively refreshed sixty times per second rather than thirty, thereby avoiding the sensation of flicker.

Figure 1A:
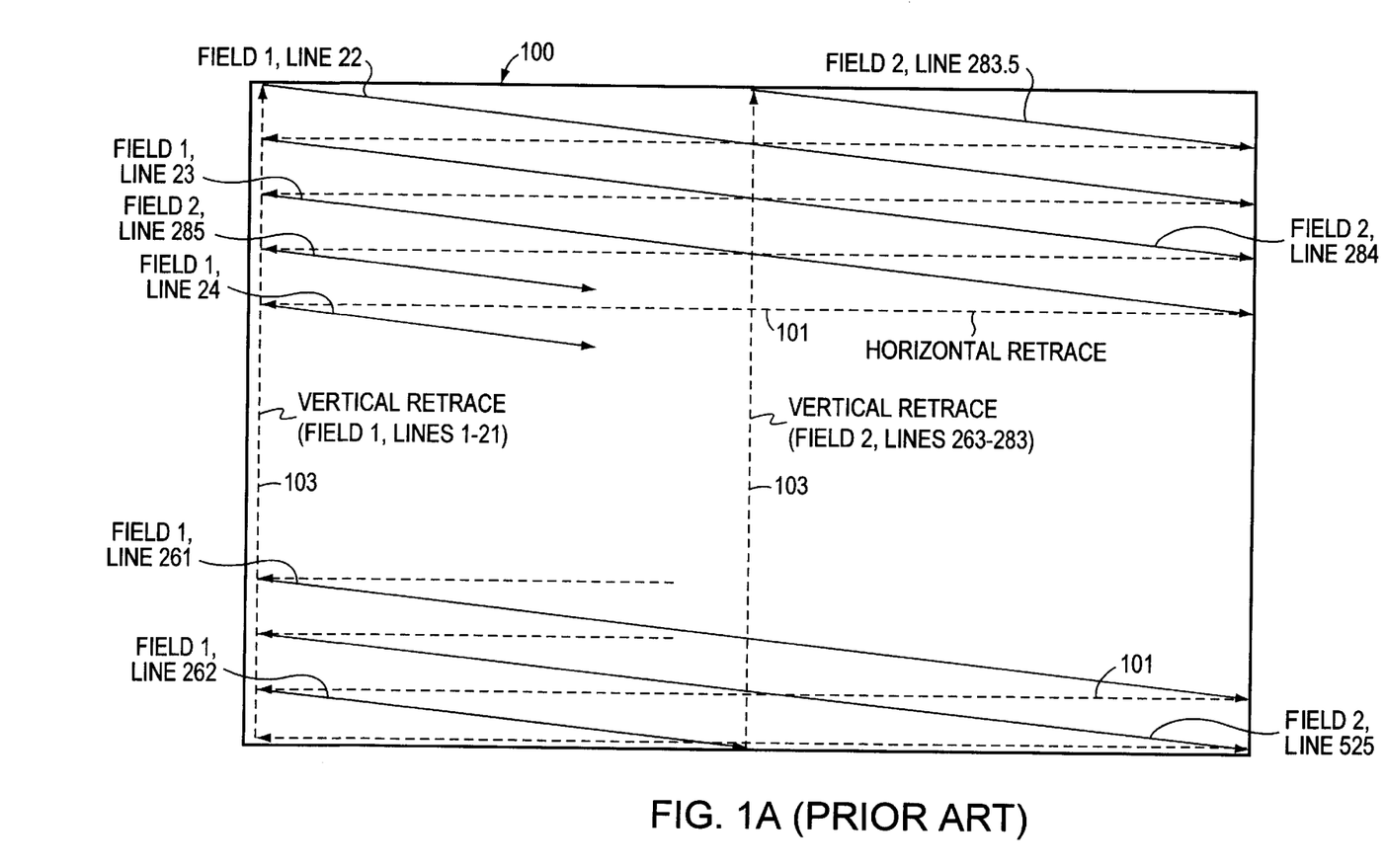
FIG. 1A, previously discussed, is a schematic diagram of a scanning pattern on a television screen according to the prior art.

Referring to FIG. 1A, a screen 100 is shown. The scanning pattern utilized in the U.S. starts at the upper left corner of the screen 100 with FIELD1, LINE22. The beam then scans from left to right across the screen 100, modifying the resulting illumination at each point. At the end of each line, the beam is rapidly swept back to the left side of the screen 100 as shown by the dashed horizontal lines 101. This is known as a "horizontal retrace". The beam reaches the bottom middle of the screen 100 at LINE262.5. The beam is then rapidly swept from the bottom middle of the screen 100 up to the top middle of the screen 100 as indicated by dashed vertical line 103. This is known as a "vertical retrace". During the horizontal and vertical retrace periods the electron beam is turned off (i.e., blanked out), since no imaging occurs during these intervals.

From the top middle of the screen 100, the beam resumes imaging with LINE283.5 of FIELD2 and scans through to LINE525 of FIELD2. The beam is then returned to the top left corner of the screen 100 with another vertical retrace 103, thereby completing the scanning pattern. The beam is now ready to begin scanning the next image.

As shown, each vertical retrace comprises twenty-one consecutive lines. That is, LINE1–LINE21 of FIELD1 and LINE263–LINE283 of FIELD2 correspond to the vertical retraces. Accordingly, out of a total of 525 lines per frame, 42 lines are blanked out during vertical retracing. These twenty-one lines per field are known as the vertical blanking interval (VBI) and, as set forth above, unlike the remaining 483 lines of the frame, the lines of the vertical blanking intervals do not carry any imaging information.

Figure 1B:
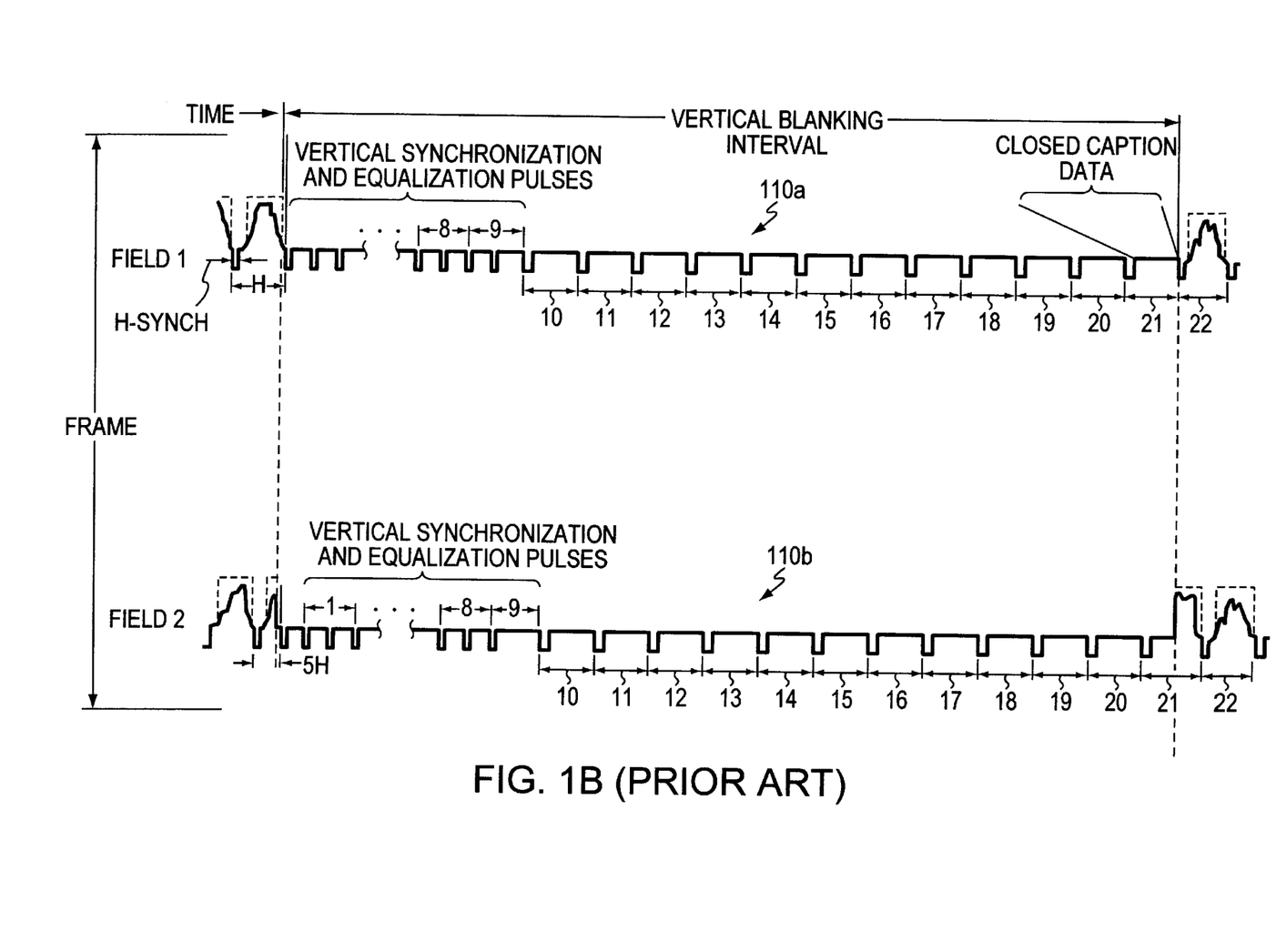
FIG. 1B, previously discussed, is a timing diagram illustrating the vertical blanking interval of two fields of a video frame according to the prior art.

FIG. 1B is a schematic illustration of a plurality of lines, including the lines corresponding to the vertical blanking interval 110a and 110b of each field of a frame. As set forth above, each vertical blanking interval 110a, 110b comprises the equivalent of twenty-one horizontal lines of the scanning pattern. None of these lines, however, carries analog television signals since the beam is blanked out during this interval. Furthermore, according to the standards governing television signals in the U.S., lines one through nine of each vertical blanking interval 110a, 110b carry vertical synchronization, pre-equalizing and post-equalizing pulses. That is, these lines are used to synchronize the vertical retracing of the electron beam.

Similarly, each line of the television signal, represented generally by the reference letter H, includes a horizontal synchronizing (H-synch) pulse. The H-synch pulse, which is typically located at the end of the each line, triggers the scanning circuits to blank out the beam and sweep it rapidly back to the left.

As mentioned above, LINE1 though LINE9 of the vertical blanking intervals 110a, 110b are used to carry vertical synchronizing and other information. In addition, LINE21 of the vertical blanking interval 110a corresponding to field one is designated to carry closed captioning information. Closed captioning is a technique used to visually display audio information in text format on a television screen for the hearing impaired. Nevertheless, LINE10 through LINE20 of FIELD1 and LINE10 through LINE21 of FIELD2 are available to carry auxiliary data, referred to as "teletext data". That is, data, such as digital or analog data, may be inserted into these lines without affecting the resulting video signal, since these lines are not used to carry any imaging or other information.

The ability to insert data into the available lines of the vertical blanking interval presents a significant opportunity to transmit data at relatively low cost. First, the infrastructure needed to transmit this data already exists and is in place. No additional transmitting equipment or power is required. The data may simply be inserted into existing transmissions. Second, the inserted data may be accessed by anyone within the broadcast reach of the underlying television signal. Thus, VBI inserted data has the potential of reaching hundreds of thousands of people without any appreciable delay and at little added cost.

Despite these many advantages, current devices for use in inserting data into the vertical blanking interval of television signals are relatively inefficient, inflexible and costly to operate. For example, the TES3 VBI Encoding Platform from Norpak Corporation can only insert data into a single channel. See TES3 product sheet from Norpak Corp. Thus, cable television operators who often carry sixty or more channels must purchase, install and maintain a separate, dedicated TES3 Platform for each channel. This significantly raises the cost and complexity of offering VBI data insertion services.

The TES3, moreover, can only accept data for insertion purposes through a serial communications port, substantially limiting the rate at which data may be inserted into the VBI. In addition, the TES3 is typically pre-configured to insert received data only into the available lines of the vertical blanking interval. Thus, it is extremely difficult, assuming it is even possible, for example, to insert data into something less than all of these available lines should some implementation choose to use less than all of the vertical blanking interval.

It is an object of the present invention to provide an improved VBI insertion device that is capable of inserting data into multiple channels. The insertion device should additionally provide a high level of data throughput. The device should also be preconfigurable to insert data into any preselected lines, such as the lines of the vertical blanking interval or all lines of otherwise unused channels. Furthermore, to provide a high degree of flexibility, the device should be programmable.

SUMMARY OF THE INVENTION

Briefly, the invention overcomes the disadvantages of the prior art by providing an improved data insertion device that enables multiple channels to be simultaneously accessed for data insertion. The data inserter of the present invention preferably includes a digital signal processor (DSP) for controlling the insertion of data into a plurality of channels. The DSP preferably receives data to be inserted through a parallel interface. The data may be provided by any number of devices such as an internet server, a personal computer or other data generating device. A plurality of video or television signals, each representing a separate programming channel into which data may be inserted, are also provided to the improved insertion device. The DSP, moreover, receives and monitors the vertical synch pulses from each of these channels so as to identify a valid frame for data insertion.

The insertion device also includes a dual port memory structure that is capable of storing data for multiple channels. In the illustrated embodiment, the dual port memory structure is composed of two dual port memory devices each of which is operatively coupled via a first port to the DSP. Coupled to a second port of each dual port memory device is an autobuffer unit, which is also operatively controlled by the DSP. For each programming channel, moreover, the improved inserter includes a switch that is coupled to receive video signals from its respective channel. Each switch is also coupled to one of the autobuffer units to receive data therefrom. A single output is provided for each switch.

In operation, data is received by the DSP over the parallel interface and examined to identify the channel in which it is to be inserted. The data also may be checked for errors and de-packetized. Next, the DSP divides the data into blocks and loads the data blocks into the dual port memory via the first port. Each block preferably contains the data to be inserted into a single line of the video signal and includes an indicator identifying the particular line. Although the DSP may be configured to utilize any lines of the video signal for data insertion, the valid lines are preferably selected so as to prevent data from being inserted over a line carrying image or other information.

The autobuffer unit, which is coupled to the dual port memory holding the respective data, monitors the lines of the respective channel and, for each line, determines whether data is available for insertion. Upon reaching a valid line, the autobuffer unit begins transferring the data from the corresponding block in the dual port memory to the switch associated with the respective channel. The data is transferred by the autobuffer unit through the second port of the dual port memory. The switch receives the data from the autobuffer unit and inserts it into the corresponding line of the respective channel coinciding therewith. When the switch stops receiving data from the autobuffer unit, it shifts back to outputting the image-carrying lines of the received video signal. Accordingly, the output of each switch of the data inserter is a video signal into which data has been inserted into selected video lines. This data may then be captured by a receiver configured to extract the data from the selected video lines of the corresponding television signal.

The data may then be displayed, printed or otherwise operated upon by the receiving device.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENT

I. Overview of the System

Figure 2:
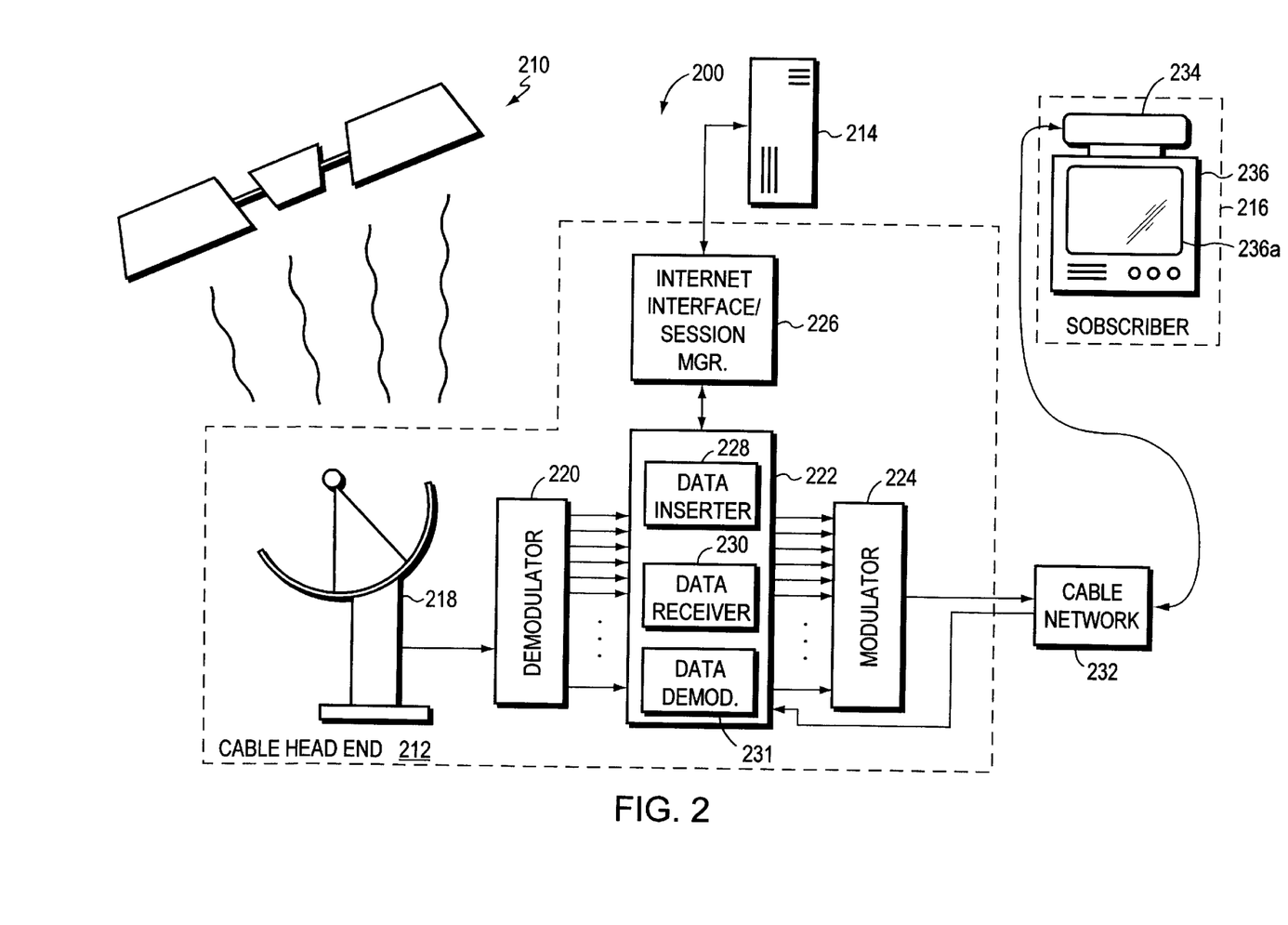
FIG. 2 is a schematic illustration of an interactive television programming system according to the present invention.

FIG. 2 illustrates an interactive television system 200 in accordance with the present invention. The interactive system 200 preferably includes a satellite 210 for providing television programming signals, a cable television head end system 212, a computer network server 214 (accessing, for example, the well-known Internet) coupled to the head end system 212 and at least one subscriber 216. Furthermore, the cable head end system 212 includes a satellite dish 218 for receiving programming signals from the satellite 210. The dish 218 is connected to a demodulator 220, which, in turn, is connected to a communications server 222. Preferably coupled to the communications server 222 are an internet interface/session manager 226 and a demodulator 224. Session manager 226 may be connected to one or more internet servers 214. In addition, communications server 222 preferably includes a data inserter 228 in accordance with the present invention, a data receiver 230 and a data demodulator 231.

The interactive television system 200 operates as follows. One or more television programming signals are delivered to the cable head end system 212 via satellite 210. The signals are captured by satellite dish 218 and passed to the demodulator 220. The demodulator 220 separates out the individual video and audio programming signals from the signals supplied by the satellite 210. Each of the individual programming signals is then fed to the communications server 222. From the communications server 222, these individual signals may be passed to the modulator 224 for processing. For example, modulator 224 may combine each video signal with its corresponding audio signal and process the resulting signals for subsequent transmission, including scrambling the signals.

The processed signals are then distributed across a cable network 232 associated with the head end system 212. Subscribers who are connected to the cable network 232 may receive the signals being distributed over the network 232. Specifically, each subscriber, such as subscriber 216, employs a commercially available set-top converter 234, to receive and unscramble the signals from the head end system 212, and a television 236 having a screen 236a.

Specific programming received at the set-top converter 234 may be displayed on the television 236 by selecting the corresponding channel at the converter 234.

In addition to delivering individual programming channels, system 200 also provides interactive services to the subscriber's home 216. For example, a subscriber, viewing an advertisement on television 236, may wish to view that advertiser's corresponding web page. Preferably, the subscriber enters appropriate keystrokes on an input device, such as a wireless keyboard or a remote control (not shown), that are sensed by the set-top converter 234. The set-top converter 234 then transmits these inputs upstream on the cable network 232 to the head end system 212. In particular, the set-top converter 234 may transmit these inputs in the radio frequency (RF) sub-band of the cable signal. The set-top converter 234, moreover, includes the necessary components, such as a transmitter and tuner (not shown), to perform these tasks.

At the head end system 212, the inputs are received by data demodulator 231 and data receiver 230 and decoded by the communications server 222. Server 222 preferably directs the interface/session manager 226 to call up the respective web page on internet server 214. Since the communications server 222 "knows" which advertisement was being displayed at the time of the subscriber's request, the subscriber need not enter the advertiser's Universal Resource Locator (URL) address. Data, such as Hyper Text Markup Language (HTML) files, corresponding to the selected web page are then downloaded from internet server 214 to the head end system 212 at session manager 226. Session manager 226 transmits these files to communications server 222 for delivery to the requesting subscriber.

Specifically, communications server 222 removes any communication protocol headers and otherwise processes the received HTML files so as to generate a bitmap that may be used to drive the subscriber's television screen 236a. Data files corresponding to this bitmap are then provided to data inserter 228. Communications sever 222 also instructs data inserter 228 to insert these files into some portion, typically the vertical blanking interval (VBI), of a selected programming channel received from demodulator 220. As described in more detail below, data inserter 228 receives the files from the communications server 222 and inserts the corresponding data into the desired portion of the selected channel. The resulting signal, which represents a combination of the corresponding programming channel and the data files, is then provided by the communications server 222 to the modulator 224. The combined video/data signal is then distributed across cable network 232 and received by subscriber 216.

The subscriber's set-top converter 234, which has been commanded to tune to the programming channel into which the requested data has been inserted, extracts the requested data and recovers the bitmap. Based upon the received bitmap, set-top converter 234 drives television screen 236a so as to display the selected website. As shown, a subscriber may select and receive data files, including web pages, for display on his or her television screen through a cable head end system. The selection, delivery and display of such data, moreover, may all be accomplished without a personal computer and associated application programs disposed at the subscriber's home.

II. Description of the Improved Data Inserter

Figure 3:
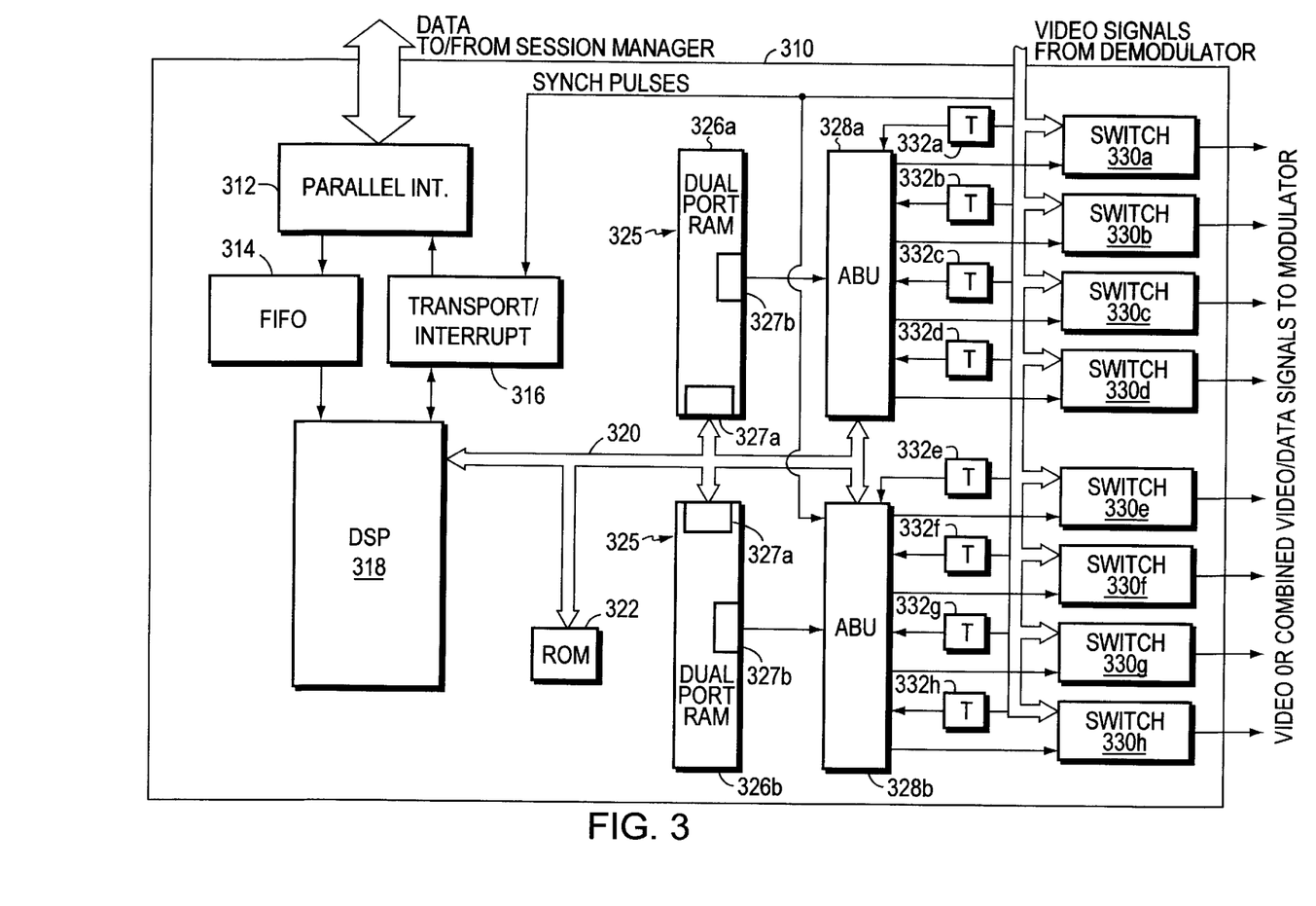
FIG. 3 is a schematic block diagram of the data insertion device of FIG. 2.

FIG. 3 is a high level schematic diagram of an improved data inserter 310, corresponding to data inserter 228 of FIG. 2. Data inserter 310 preferably includes a parallel interface 312 for receiving digital data. Parallel interface 312, which preferably supports two-way communications, as discussed below, may be an Extended Capabilities Port (ECP) as set forth by IEEE standard 1284 supporting a data throughput of 2 Mbytes per second. Connected to the parallel interface are a first-in-first-out intermediary storage device (FIFO) 314 and a transport/interrupt processor 316. The FIFO 314 and transport/interrupt processor 316 are preferably connected to a digital signal processor (DSP) 318, which, as discussed herein, governs the operation of data inserter 310.

The DSP 318 also includes and is connected to data, address and control buses, represented generally by the reference numeral 320. At least one programmable read only memory (ROM) 322, such as an electrically erasable programmable read only memory (EEPROM) circuit, is likewise connected to the DSP 318 via bus 320. ROM 322 provides non-volatile storage of instruction sets used to control the operation of the DSP 318 upon initialization.

Inserter 310 further includes a dual port memory structure designated generally by reference numeral 325. In the illustrated embodiment, dual port memory structure 325 is composed of a plurality of dual port memory devices 326a, 326b, such as random access memories (RAM). Each dual port memory device 326a, 326b is operatively coupled by a first port 327a to the DSP 318 via buses 320. For each dual port memory 326a, 326b, moreover, a corresponding autobuffer unit 328a, 328b is also provided. The autobuffer units 328a, 328b are each coupled to a second port 327b of their respective memory device 326a, 326b. Also, the autobuffer units 328a, 328b are connected to buses 320 so that they may receive data, control and address information from DSP 318, as discussed below.

Television or video signals corresponding to a plurality of individual programming channels are also provided to inserter 310. For each video signal received by inserter 310, a separate, dedicated switch 330a–330h is provided and the signal from each individual video channel is provided to its corresponding switch 330a–330h. As shown, each switch 330a–330h is also connected to one of the autobuffer units 328a, 328b. That is, each switch 330a–330h includes two inputs; one for receiving the video signals from its corresponding video channel and the other for receiving data from the associated autobuffer unit 328a, 328b. Each switch 330a–330h also includes a single output for delivering either video signals or data. In the preferred embodiment, inserter 310 includes two dual port memory devices 326a, 326b, two autobuffer units 328a, 328b and eight switches 330a–330h. The preferred inserter 310 is thus capable of receiving video signals from eight different programming channels and inserting a different datastream into each of these video signals. Synchronization pulses from the video signals are provided to the transport/interrupt processor 316 and the autobuffer units 328a, 328b.

In the preferred embodiment, inserter 310 also includes a plurality of timing circuits 332a–332h. Each timing circuit 332a–332h, moreover, is preferably associated with one of the switches 330a–330h and, as described below, monitors the horizontal synch pulses from the video signal coupled to the associated switch 330a–330h. The timing circuits 332a–332h are also coupled to the autobuffer units 328a, 328b so as to provide the autobuffer units 328a, 328b with inputs relative to data insertion.

III. Operation of the Improved Data Inserter

Basically, inserter 310 receives digital data at parallel interface 312 from communications server 222 (FIG. 2) and inserts that data into a preselected video signal, received from demodulator 220, at the corresponding switch 330a–330h. If no data is to be inserted into a given channel, the corresponding video signals are passed untouched through the corresponding switches 324a–324h. The output from each switch 330a–330h of inserter 310 is thus either an unmodified video signal or a combined video/data signal. These video and/or combined video/data signals are then provided to modulator 224 and transmitted by cable head end 212 across the corresponding network 232 for receipt by a subscriber.

Specifically, data for insertion (e.g., an HTML file) is received at session manager 226 (FIG. 2). The session manager 226 preferably packetizes and adds error correction information to the received data. The data is then provided to the communications server 222, which selects the video signal into which the data is to be inserted. Any conventional selection process may be implemented to identify the channel on which the data is to be inserted. Communications server 222 also adds control information to each packet identifying the selected video signal in which the data is to be inserted. The control information may be inserted into a header appended to the data. Communications server 222 then provides the packetized data to the data inserter 310 (FIG. 3) via parallel interface 312. Server 222 preferably transmits the packetized data in chunks each sized for insertion into a single frame of the respective video signal.

Packetized data is forwarded by the parallel interface 312 to the FIFO 314 where it is temporarily stored. FIFO 314 operates under the direction of the transport/interrupt processor 316 and, by buffering the data, facilitates two-way data transmission across interface 312. DSP 318, in turn, retrieves and examines the data from the FIFO memory 314. Specifically, DSP 318 examines the header of the packetized data to determine which video signal the data is to be inserted into. DSP 318 may also test the data for error conditions. Assuming the data is valid, it is moved by DSP 318 to one of the dual port memory devices 326a, 236b, via bus 320 and first port 327a. In particular, DSP 318 divides the data into blocks and moves each block to the one memory device, e.g., device 326a, that is coupled to the corresponding autobuffer unit, e.g., unit 328a, associated with the selected video channel into which the data is to be inserted. As set forth above, each autobuffer unit 328a, 328b is associated with a plurality of the video signals (e.g., four).

Each data block, moreover, corresponds to a given line of the respective video signal and includes a line number identifying the particular line in which the block of data is to be inserted. Preferably, each data block is loaded with sufficient data (e.g., thirty-three bytes) by DSP 318 to fill a single line of the corresponding video channel.

In the meantime, interrupt processor 316 continuously monitors the video signals received at inserter 310. In particular, interrupt processor 316 looks for and identifies the vertical synch pulses in each of the video signals received at inserter 310. As set forth above, each field of every frame has one vertical synch pulse located in the first few lines of the corresponding vertical blanking interval. As each video signal reaches a vertical synch, interrupt processor 316 transmits an interrupt flag to the DSP 318.

In response, the DSP 318 may poll the interrupt processor 316 to identify the corresponding channel. When the DSP 318 learns that the selected video signal has reached a vertical synch, it loads a pointer into the autobuffer unit 328a. The pointer identifies the section of the dual port memory 326a at which the data to be inserted in the corresponding video frame is stored. DSP 318 also informs the autobuffer unit 328a of the switch, e.g., switch 330c, associated with the video signal into which the data is to be inserted.

Further responsibility for data insertion is now handled by the respective autobuffer unit 328a. In particular, upon receiving the pointer from the DSP 318, the autobuffer unit 328a begins counting the horizontal synch pulses of the respective video channel, preferably starting at "0". As set forth above, each line of every frame has a corresponding horizontal synch pulse. At each horizontal synch pulse, the autobuffer unit 328a compares the present count with the line number associated with the first block of data to be inserted. For example, assume that the first block of data is to be inserted into line "5". Upon reaching the first horizontal synch, the counter at the autobuffer unit 328a is incremented to "1" and no match is detected. At the next horizontal synch, the counter is incremented and a comparison made between the counter (now at "2") and the line number of the first block of data (i.e., "5"). Again, no match is detected. When the counter reaches "5", however, a match is detected by the autobuffer unit 328a, indicating that a valid line has been reached.

The autobuffer unit 328a now looks to the associated timing circuit 332c to determine the point at which data insertion may commence. More specifically, each timing circuit 332a–332h is preferably pre-set to the amount of time between the horizontal synch pulse and the starting point for data insertion at the corresponding line. For example, under the North American Basic Teletext Specification (NABTS) standard, this value is 10.48±0.34 microseconds. When the starting point for data insertion is reached, the corresponding timing circuit 332a–332h informs the autobuffer unit 328a. Although the timing circuits 332a–332h may be configured to continuously inform the corresponding autobuffer units 328a, 328b of the starting points of data insertion for each horizontal line, the autobuffer units 328a, 328b are only interested in this information when there is data to be inserted into the respective line.

In response to receiving the go ahead from the corresponding timing circuit 332c, the autobuffer unit 328a begins transferring bytes of data from the data block corresponding to this line. In particular, the autobuffer unit 328a utilizes the second port 327b on the corresponding dual port memory 326a to obtain the data. These bytes of data are transferred by autobuffer unit 328a to the switch 330c associated with the selected video signal.

The switch 330c associated with the selected channel is preferably driven by the receipt of data from the corresponding autobuffer unit 328a. That is, switch 330c normally outputs the received video signal unmodified. Once the switch 330c begins receiving digital data from its corresponding autobuffer unit 328a, however, switch 330c begins outputting the received data into the corresponding line of the selected video signal coinciding with the receipt of data. Autobuffer unit 328a, moreover, is configured to transfer the entire block of data from the dual port memory 326a to the corresponding switch 330c at a prescribed rate. For example, the NABTS standard provides for a data insertion rate of 5,727,272 bits per second. When switch 330c stops receiving digital data from its corresponding autobuffer unit 328a, it shifts back to outputting the incoming video signal.

The autobuffer unit 328a then looks for the next match between the line number associated with the second block of data to be inserted (e.g., line "10") and the horizontal synch count. More specifically, the autobuffer unit 328a continues to count horizontal synch pulses and to compare the current count with the line number associated with the next block of data that is to be inserted. As each match is detected, the corresponding data block is inserted into the identified line as described above. This process is repeated until all of the data blocks stored at memory device 326a for this frame of the video signal have been inserted by the autobuffer unit 328a.

In the preferred embodiment, the data blocks corresponding to a frame are contiguously arranged in consecutive order in the respective memory. Nonetheless, other arrangements, such as linked lists, may also be utilized.

While the autobuffer unit 318a is inserting data into the respective lines of the first field, data to be inserted into the next field of the video signal is received by the DSP 318 via interface 312 and FIFO 314. This data is similarly divided into blocks (each corresponding to a valid line for insertion) and loaded into the respective memory device 326a. Upon reaching the next vertical interrupt, the DSP 318 loads the autobuffer unit 328a with a pointer to the area of memory device 326a where this second field of data is located. As described above, the autobuffer unit proceeds to insert the data into the valid lines of the respective field.

This process of loading the dual port memories and triggering the autobuffer units upon commencement of a field for data insertion is repeated by the DSP 318 until all of the received data has been inserted into the selected video signal. As valid lines for insertion are reached, the autobuffer unit 328a moves the data intended for that line to the switch 330c associated with the selected video channel. Moreover, while the autobuffer units 328a, 328b are removing data from the second port 327b of their respective dual port memories 326a, 326b, DSP 318 may be loading these memories 326a, 326b with additional data via buses 320 and first ports 327a.

In addition, DSP 318 moves data from the FIFO 314 to the dual port memories 326a, 326b and loads the corresponding autobuffer units 328a, 328b with pointers to different areas of the memories 326a, 326b so as to insert different datastreams into a plurality of video signals simultaneously. In particular, DSP 318 and buses 320 preferably operate at a clock rate that is some multiple of the insertion bitrate set forth in the NABTS standard (i.e., 5.727 Mhz). For example, if inserter 310 is to support data insertion for eight video signals, DSP 318 and buses 320 preferably operate at 45.816 Mhz (i.e., eight times 5.727 Mhz).

To facilitate the transfer of data, DSP 318 preferably utilizes a conventional memory mapping formula or algorithm. Such formulas are well known to those skilled in the art and will not be described in detail herein. The formula preferably utilizes the channel and field as its operators. That is, by entering a given channel and field, the formula directs the DSP 318 to an area in the respective memory 326a, 326b in which the data (for that channel and field) is to be stored. The location of the first entry in this area is then provided to the autobuffer unit 328a, 328b upon receipt of the corresponding vertical synch by the DSP 318. As described above, the corresponding autobuffer unit 328a, 328b then accesses this area of memory and, beginning with the line number stored at the first entry block, compares horizontal synchs with this line number.

As mentioned above, the operation of DSP 318 is preferably governed by the instruction set(s) contained in ROM 322. Specifically, ROM 322 may be loaded with an instruction set via parallel interface 312. Upon initialization of data inserter 310, DSP 318 accesses ROM 322 and loads the corresponding instruction set stored therein. This instruction set preferably identifies the particular horizontal lines that may be utilized for data insertion for each video signal received by inserter 310 (i.e., the selected or valid lines).

Notably, the DSP 318 may be programmed via the instruction set to utilize any number of lines of a given video signal for data insertion. Although the most common implementation will correspond to the available lines of the vertical blanking interval, the DSP 318 may be instructed to designate any number of lines of a given video signal as valid lines for data insertion. For example, if a cable head end operator carries a channel that contains no corresponding programming, data may be inserted into every line of the corresponding video signal not just the vertical blanking interval (i.e., LINE10–LINE262 in FIELD1 and the corresponding lines of FIELD2). This is referred to as "full-field data transmission" and results in substantial data throughput on the designated channel. Similarly, DSP 318 may be instructed to use some subset of the VBI lines of another channel, where several of the VBI lines are being utilized for other purposes.

The selection of valid lines for data insertion for each channel, moreover, may be quickly changed by the cable head end operator. More specifically, by simply changing the instruction sets maintained in ROM 322 via parallel interface 312, the DSP 318 of data inserter 310 may be quickly modified to insert data into an entirely different set of lines for any or all of the respective channels.

Figure 4:
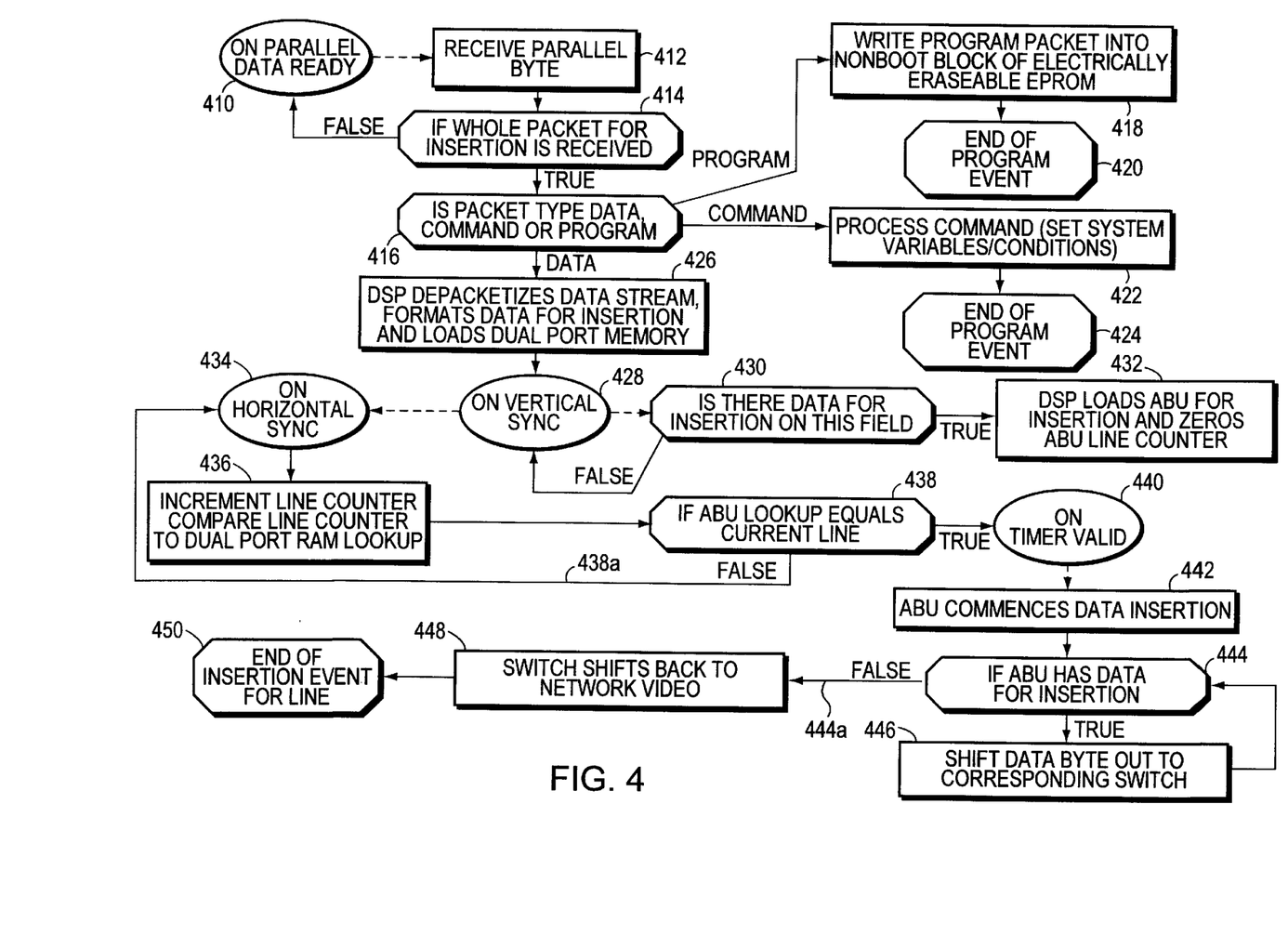
FIG. 4 is a flow diagram of a method used by the data insertion device of FIG. 2 to insert data into the available lines of a video signal.

FIG. 4 is a flow chart illustrating the steps of the insertion technique described above. Upon initialization, data inserter 310 (FIG. 3) loads the instruction set(s) stored in ROM 322 and is ready to receive data on parallel interface 312 as shown by block 410. As bytes of data are received at parallel interface 312, they are initially buffered at FIFO 314 by the transport/interrupt processor 316 as indicated by block 412. FIFO 314 collects the bytes at block 414 until a complete packet is received. Once a complete packet is received, it is moved to DSP 318 which examines the packet at box 416 to determine whether it corresponds to data, program or command information. If the packet contains program information, it is moved by DSP 318 to ROM 322 via buses 320. The contents of the program packet is then stored at ROM 322 as shown by block 418. Once stored, the disposition of program information is complete as illustrated by block 420. If the received packet contains command information, DSP 318 preferably executes the command at box 422 and concludes the processing of such information at box 424.

It should be understood that inserter 310 may include a separate ROM interface (not shown) for use in providing program information directly to ROM 322. Also, instruction sets may be "burned" into ROM 322 at an EPROM programming station (not shown).

If the packet contains data, DSP 318 preferably de-packetizes, processes and moves the data to the dual port memory structure 325 as shown at box 426. Vertical synch pulses are provided by interrupt processor 316 to DSP 318 as indicated by block 428. Upon receipt of a vertical synch pulse, DSP 318 determines, at block 430, whether it has data to be inserted in the field corresponding to the received vertical synch. If so, DSP 318 loads the respective autobuffer unit 328a, 328b with a pointer to the area of memory containing the data to be inserted and the autobuffer unit zeros its horizontal synch counter, as shown at box 432.

Next, the autobuffer unit 328a, 328b begins counting horizontal synch pulses at block 434 to identify a valid line for data insertion. In particular, as shown at box 436, the autobuffer unit 328*a*, 328*b* increments its counter at each horizontal synch and compares the counter to the line number contained in the next data block to be inserted. If a match exists between the counter and the line number of the data block, as shown at block 428, the autobuffer unit 328*a*, 328*b* begins the data insertion process. Otherwise, the autobuffer unit 328*a*, 328*b* waits for the next horizontal synch to increment its counter, as shown by false line 438*a*.

As shown at block 440, the autobuffer unit 328*a*, 328*b* waits for the corresponding timing circuit 332*a*–332*h* to indicate the appropriate time to begin data insertion. At the appropriate time, the autobuffer unit 328*a*, 328*b*, at block 442, begins fetching data from the data block and transferring it to the switch 330*a*–330*h*. As shown by blocks 444 and 446, so long as data remains in the identified block of the dual port memory structure 325, the autobuffer unit 328*a*, 328*b* continues to move that data to the respective switch 330*a*–330*h*. When autobuffer unit 328*a*, 328*b* has no more data to transfer as indicated by false arrow 444*a*, the switch 330*a*–330*h* stops receiving data. In response, the switch 330*a*–330*h* shifts back to outputting the corresponding network or programming video channel at box 448. The data for the valid line has thus been inserted completing the disposition of the data block as indicated by box 450.

As mentioned above, DSP 318 preferably provides communications server 222 (FIG. 2) with information via parallel interface 312. For example, DSP 318 may provide communications server 222 with insertion statistics and synchronization information to facilitate the orderly insertion of data into various video signals. Specifically, the DSP 318 may inform server 222 that the DSP 318 is ready to receive another chunk of data to be inserted. The DSP 318 may also inform the server 222 of errors in received data detected by the DSP 318 or of errors in the video signals (e.g, loss of signal or loss of synchronization). If errors are detected in received data, the DSP 318 preferably discards the data and requests a replacement from server 222.

It should be understood that the dual port memory structure may be included within the autobuffer unit. That is, data may be transferred by the DSP directly to the autobuffer unit via a first port. The autobuffer unit then stores the data in an internal dual port memory structure. Thereafter, the autobuffer unit, in response detecting a valid line for insertion, moves the data via a second port to the respective switch.

It should also be understood that the DSP may manage the insertion of data at each line. In particular, the DSP may monitor horizontal synch pulses, in addition to vertical synch pulses, so as to identify each valid line for data insertion. Upon identifying a valid line, the DSP triggers the respective autobuffer unit. In response to being triggered, the autobuffer unit transfers the data from the dual port memory to the respective switch.

It should be further understood that a quad port or other multiple port memory structure may be utilized in place of the dual port memory.

Although the preferred embodiment of the invention is described in the context of an interactive television system in which the inserted data drives a television screen, it should be understood that the data inserter of the present invention is useful in any system where it is desired to insert data into one or more video signals. For example, the improved data inserter of the present invention may be used to transmit files from e-mail or proxy servers, as well as from internet servers. Depending on its format, moreover, the data received at the subscriber's home may be printed or electronically stored by the subscriber in addition to or in place of being displayed.

The foregoing description has been directed to specific embodiments of this invention. It will be apparent, however, that other variations and modifications may be made to the described embodiments, with the attainment of some or all of their advantages. Accordingly, this description should be taken only by way of example and not by way of limitation. For example, it should be understood that the improved data inserter of the present invention may be used in an equally advantageous manner to insert data into television signals that are transmitted over radio frequencies in addition to cable networks. It is the object of the appended claims to cover all such variations and modifications as come within the true spirit and scope of the invention.

What is claimed is:

1. An apparatus for inserting digital data into selected lines of a video signal, the apparatus receiving a plurality of video signals each corresponding to a programming channel and having vertical and horizontal synchronization pulses disposed therein for identifying individual lines of the signal, the apparatus comprising:

a parallel interface for receiving the digital data to be inserted;

a digital signal processor coupled to receive the digital data from the parallel interface, the digital signal processor including a bus structure and being constructed and arranged to monitor at least the vertical synchronization pulses of each received video signal;

a dual port memory structure having a first port and a second port, the dual port memory structure being connected through the first port to the bus structure for receiving and temporarily storing digital data from the digital signal processor;

at least one autobuffer unit associated with the dual port memory structure, the at least one autobuffer unit connected to the second port of the dual port memory structure for receiving digital data stored therein and to the bus structure so as to permit the digital signal processor to load instructions into the autobuffer unit; and a switch associated with each received video signal, each switch connected to receive its corresponding video signal and further coupled to an autobuffer unit so as to receive digital data temporarily stored in the dual port memory structure, wherein the digital signal processor is constructed and arranged to receive digital data to be inserted into a given video signal via the parallel interface, transfer that data via the bus structure to a predetermined location in the dual port memory structure and load the at least one autobuffer unit with a pointer identifying the location of the data within the dual port memory structure and the switch coupled to the given video signal, and wherein the autobuffer unit is constructed and arranged to identify the selected lines for data insertion in the given video signal by monitoring at least the horizontal synchronization pulses and, in response, to retrieve the temporarily stored data at the predetermined location in the dual port memory structure from the second port and transfer the data to the identified switch whereby the switch inserts the received data into the selected lines of the selected video signal.

2. The apparatus of claim 1 further comprising a timing circuit associated with each video signal, each timing circuit coupled to the at least one autobuffer unit and configured and arranged to receive and detect horizontal synchronization pulses from the associated video signal and to provide a data insertion message to the at least one autobuffer unit at a preselected time following the detection of a horizontal synchronization pulse.

3. The apparatus of claim 2 further comprising a transport/interrupt processor coupled to the digital signal processor, the transport/interrupt processor configured and arranged to receive and detect vertical synchronization pulses from the video signals and to provide an interrupt flag to the digital signal processor in response to the detection of a vertical synchronization pulse.

4. The apparatus of claim 3 wherein the digital signal processor loads the at least one autobuffer unit with the pointer in response to receiving an interrupt flag that corresponds to the given video signal.

5. The apparatus of claim 4 wherein the digital signal processor, in response to receiving an interrupt flag, polls the transport/interrupt processor to determine which video signal reached its vertical synchronization pulse.

6. The apparatus of claim 5 wherein the digital signal processor divides the received digital data into one or more data blocks, each data block containing digital data for insertion into a preselected horizontal line of a video signal and including information identifying the respective horizontal line.

7. The apparatus of claim 6 wherein the digital signal processor organizes a set of data blocks, including a first data block, containing digital data for insertion into a frame of the given video signal, transfers the set of data blocks to the predetermined location in the dual port memory structure, and, in response to receiving the interrupt flag from the transport/interrupt processor for the given video signal, loads the at least one autobuffer unit with the pointer.

8. The apparatus of claim 7 wherein the at least one autobuffer unit, in response to receiving the pointer from the digital signal processor, determines the horizontal line number associated with the first data block from the set of data blocks.

9. The apparatus of claim 8 wherein the at least one autobuffer unit includes a horizontal synchronization pulse counter and, in response to receiving the pointer from the digital signal processor, initially zeroes and begins incrementing the horizontal synchronization pulse counter in response to each data insertion message from the timing circuit associated with the given video signal.

10. The apparatus of claim 9 wherein the at least one autobuffer unit retrieves the digital data from the first data block and transfers it to the identified switch, in response to detecting a match between the horizontal synchronization counter and the preselected horizontal line associated with the first data block.

11. The apparatus of claim 10 further comprising a read only memory coupled to the digital signal processor, the read only memory containing an instruction set for governing the operations of the digital signal processor.

12. The apparatus of claim 11 further comprising a first-in-first-out memory (FIFO) coupled to the parallel interface and the digital signal processor, the FIFO configured and arranged to receive and temporarily store digital data from the parallel interface and provide the stored data to the digital signal processor.

13. An apparatus for inserting digital data into selected lines of a video signal, the apparatus receiving a plurality of video signals each corresponding to a programming channel and having vertical and horizontal synchronization pulses disposed therein for identifying individual fields and lines of the signal, the apparatus comprising:

a parallel interface for receiving the digital data to be inserted;

a digital signal processor coupled to receive the digital data from the parallel interface, the digital signal processor including a bus structure and being constructed and arranged to monitor at least the vertical synchronization pulses of each received video signal;

a plurality of dual port memory devices each having a first port and a second port, the first port of each dual port memory device connected to the bus structure for receiving and temporarily storing digital data from the digital signal processor;

an autobuffer unit associated with each dual port memory device and connected to the second port of its associated dual port memory device for receiving digital data stored therein and to the bus structure so as to permit the digital signal processor to load instructions into the autobuffer unit, each autobuffer unit having a horizontal synchronization counter;

a switch associated with each received video signal, each switch connected to receive the corresponding video signal and further coupled to one of the autobuffer units so as to receive digital data temporarily stored in the dual port memory device associated with the respective autobuffer unit;

a timing circuit associated with each video signal, each timing circuit coupled to one of the autobuffer units and configured and arranged to receive and detect horizontal synchronization pulses from the associated video signal and to provide a data insertion message to the respective autobuffer unit at a preselected time following the detection of a horizontal synchronization pulse; and a transport/interrupt processor coupled to the digital signal processor, the transport/interrupt processor configured and arranged to receive and detect vertical synchronization pulses from the video signals and to provide an interrupt flag to the digital signal processor in response to the detection of a vertical synchronization pulse, wherein the digital signal processor is constructed and arranged to receive digital data to be inserted into a given video signal via the parallel interface, transfer that data via the bus structure to a predetermined location in the dual port memory device associated with the given video signal, and load the at least one autobuffer unit with a pointer identifying the location of the data within the dual port memory structure and the switch coupled to the given video signal, in response to receiving an interrupt flag from the transport/interrupt processor for the given video signal, and wherein each autobuffer unit is constructed and arranged to zero its horizontal synchronization pulse counter in response to receiving the pointer from the digital signal processor, to increment its horizontal synchronization pulse counter in response to data insertion messages from the timing circuit, and, upon detecting a match between its horizontal synchronization pulse counter and the data in the predetermined to retrieve the temporarily stored data from the second port of the dual port memory device and transfer the data to the identified switch whereby the switch inserts the received data into the matching line of the selected video signal.

14. A method for inserting digital data into selected lines of a plurality of video signals, each video signal corresponding to a programming channel and having vertical and horizontal synchronization pulses disposed therein for identifying individual lines of the signal, the method comprising the steps of:

receiving data on a parallel interface to be inserted in a given video signal;

examining the received data to identify the given video signal;

transferring the received data to a dual port memory structure through a first port of the dual port memory structure for temporary storage of the data;

monitoring the vertical and horizontal synchronization pulses of the given video signal to identify a first selected line for data insertion;

upon identifying the first selected line, triggering an autobuffer unit coupled to a second port of the dual port data structure;

in response to the step of triggering, transferring data stored in the dual port memory structure through the second port to a switch also coupled to the given video signal; and inserting the data obtained from the second port of the dual port memory structure into the first selected line of the given video signal.

15. The method of claim 14 further comprising the steps of:

prior to the step of transferring, dividing the received data into one or more data blocks, each data block containing digital data for insertion into a particular horizontal line of the given video signal and including information identifying the particular horizontal line; and counting horizontal synchronization pulses in the given video signal and triggering the autobuffer unit in response to detecting a match between the current horizontal line of the given video signal and the particular horizontal line of a data block.

16. The method of claim 15 further comprising the step of issuing a data insertion message following expiration of a preselected amount of time after detection of a horizontal synchronization pulse, and wherein the step of inserting is in response to the data insertion message.

* * * * *